United States Patent [19]

Desurvire et al.

[11] Patent Number: 5,117,303
[45] Date of Patent: May 26, 1992

[54] METHOD OF OPERATING CONCATENATED OPTICAL AMPLIFIERS

[75] Inventors: Emmanuel Desurvire, Middletown; Clinton R. Giles, Holmdel, both of N.J.

[73] Assignee: AT&T Bell Laboratories, Murray Hill, N.J.

[21] Appl. No.: 571,958

[22] Filed: Aug. 23, 1990

[51] Int. Cl.⁵ .......... G02B 6/26; H01S 2/20; G02F 1/00
[52] U.S. Cl. .......... 359/341; 359/337; 359/343; 359/179
[58] Field of Search .......... 330/4.3; 350/96.13

[56] References Cited

U.S. PATENT DOCUMENTS

| | | | |
|---|---|---|---|
| 3,575,668 | 4/1971 | Smith | 372/33 |
| 4,205,278 | 5/1980 | George et al. | 330/4.3 |
| 4,361,814 | 11/1982 | Soclof et al. | 330/4.9 |
| 4,757,268 | 7/1988 | Abrant | 330/4.3 |
| 4,772,854 | 9/1988 | Silberberg | 350/96.13 |
| 4,938,556 | 7/1990 | Digonnet et al. | 350/96.15 |
| 4,947,134 | 8/1990 | Olsson | 330/4.3 |
| 4,979,234 | 12/1990 | Aprawal et al. | 330/4.3 |

OTHER PUBLICATIONS

Masuda et al.; "High Gain Two-Stage Amplification . . ."; May 1, 1990, Elect. Lett., vol. 26, #16, pp. 661-662; abst. only provided.

Desurvire, R.; "Analysis of Transient Gain Saturation . . ."; Aug. 1989, IEEE Photonics Technol. Lett., vol. 1, #8, pp. 196-199; abst. only provided.

Kubata et al., "Long Distance Optical Solution . . . Amplifiers"; IEEE J. Q. R., vol. 26, #4, pp. 692-700, Apr. 1990; abst only.

Suzuki et al.; "5 Gbits, 250 KM Error Free Soliter . . ."; Elect. Lett., vol. 26, #8, pp. 551-553, Apr. 14, 1990; abst. only.

Primary Examiner—Nelson Moskowitz
Attorney, Agent, or Firm—Eli Weiss

[57] ABSTRACT

In a transmission system having concatenated optical amplifiers, gain saturation of the optical amplifiers at any stage is caused by the extraction of power from the amplifier by the ASE and amplification of the signal and of the ASE from previous stages. Three methods of operating transmission systems are classsified as free-running, constant-total power and constant-signal power. Differences in performance of the three systems arise from the propagation of signal power and the buildup of the ASE. It is now disclosed that the buildup of ASE noise in a system of either lumped or distributed concatenated optical amplifers can be limited by operating at least a plurality of the optical amplifers to provide unsaturated gain which is greater than the loss of the system and/or each optical amplifier is operated in its saturated state.

4 Claims, 11 Drawing Sheets

METHOD OF OPERATING CONCATENATED OPTICAL AMPLIFIERS

TECHNICAL FIELD

This invention relates generally to optical amplifiers and more particularly to a method of operating concatenated erbium-doped fiber optical amplifiers to provide an improved mode of operation.

BACKGROUND OF THE INVENTION

Optical amplifiers may replace optoelectronic regenerators in some terrestrial and undersea long-haul transmission systems. The attraction is the potential of creating a "lightpipe" that is transparent to the bit rate and transmission format, and can convey wavelength-division multiplexed signals without the need for multiple repeaters. The difficulties associated with transmitting data long distances arise from chromatic dispersion, polarization dispersion, transmission fiber nonlinearities, optical amplifier nonlinearities and the accumulation of noise. Recent experiments have used semiconductor and erbium-doped fiber amplifiers as linear repeaters in lightwave transmission systems. The longest transmission distance reported was 2200 km. Less certain is the behavior of systems which have very long transmission distances, such as transoceanic systems operating over 7500 km.

The evolution of the signal and noise in concatenated optical amplifiers has been discussed in Quantum Electron, Vol. QE-18, No. 10 pp. 1560-1568 (1982) "S/N and Error Rate Performance in AlGaAs Semiconductor Laser Preamplifier and Linear Repeater Systems" by T. Mukai et al.; for linear optical amplifiers. However, in practice, amplifier saturation must be considered in view of the competition between the amplified spontaneous emission (ASE) and the signal for the power available from the optical amplifiers. With multiple amplifiers, this problem becomes especially severe as the ASE, which is characterized as noise, builds up in successive amplifiers to quickly cause a noise power that is higher than that of a single amplifier. In a transmission system having concatenated optical amplifiers, gain saturation of the optical amplifiers at any stage is caused by the extraction of power from the amplifier by the ASE and amplification of the signal and of the ASE from previous stages. Three methods of operating transmission systems are classified as free-running, constant-total power, and constant-signal power. Differences in performance of the three systems arise from the propagation of signal power and the buildup of the ASE.

A method for reducing the accumulation of amplified spontaneous emission noise in a system of concatenated amplifiers is needed.

SUMMARY OF THE INVENTION

It is now disclosed that the buildup of ASE noise in a system of either lumped or distributed concatenated optical amplifiers can be limited by operating at least a plurality of the optical amplifiers to provide unsaturated gain which is greater than the loss of the system and where the various optical amplifiers are operated in their saturated state.

DETAILED DESCRIPTION

This invention relates to an amplified lightwave system having concatenated optical amplifiers which, when operated in their saturated mode, provide a high signal-to-noise ratio. Current literature on amplified lightwave systems relate only to ideal, unsaturated optical amplifiers having gains which are unaffected by the amplified signal (noise) power. The current literature is not aware of the importance of, and ignores the reduction in amplifier gain caused by saturation, the competition between signal power and ASE noise power, and the efficiency of converting pump power into signal power. Because of this incomplete understanding of the operation of optical amplifiers, it is not obvious that the method of operating systems having saturated amplifiers, as we disclose, will work.

In this invention we disclose a method of operating an amplified lightwave system which has a relatively high signal to noise ratio. More specifically, in this invention, relatively high signal-to-noise ratio is obtained by operating the concatenated optical amplifiers of a transmission system in their saturated state. Conditions under which the amplified lightwave system operates satisfactorily for a large number of optical amplifiers (e.g. greater than 10) are determined and three methods of controlling the system are identified. Two methods of operation regulate the optical power, i.e. either the signal power or the total optical power (signal power plus ASE noise power). A third method of operation is unregulated, yields a low level of ASE noise system and is efficient in converting pump power into signal power. These lightwave systems may be comprised of either lumped or distributed optical amplifiers. Distributed optical amplifiers provide lower noise operation than lumped optical amplifiers to reduce the saturation cause by accumulated ASE noise and improve the signal-to-noise ratio. With this invention, it is now possible to have a lightwave system that can comprise a large number of amplifiers and still have a signal-to-noise ratio which is usable. For example, with an amplifier spacing of 100 km, an optical transmission system of 80 amplifiers can be used to span most transoceanic routes.

Erbium-doped fiber amplifiers have several advantages for transmission systems, including low insertion loss, polarization-independent gain, low crosstalk and high saturated output power. Very low noise figures have also been achieved with amplifiers having high small-signal gain, making them well-suited for concatenated amplifier systems that are sensitive to noise accumulation. Below, the static system performance is simulated using the rate-equations of the erbium-amplifier that self-consistently account for the saturated amplifier noise. A simple modification of the equations also permits modeling of distributed optical amplifiers, where the fiber of the entire transmission span is lightly doped with erbium and is pumped to compensate for the transmission losses. Improved noise performance is disclosed for this type of amplifier. Then, a model of the saturated amplifier is used to simulate several possible operating conditions for concatenated optical amplifiers. Thereafter, the bit-error-rate performance of these systems and the effects of optical filtering are observed.

The erbium-doped fiber amplifier is modeled as a three-level system having population densities in the ground level (1), metastable level (2) and pump level (3). The rate equations describing the effects of the pump ($P_p$), signal ($P_s$) and ASE ($P_a$) power on these populations are:

$$\frac{dN_1(z,t)}{dt} = -\left[\frac{\sigma_{sa}\Gamma_s}{h\nu_s A}(P_s + P_a^+ + P_a^-) + \frac{\sigma_{pa}\Gamma_p}{h\nu_p A}(P_p^+ + P_p^-)\right]N_1 + \left[\frac{\sigma_{se}\Gamma_s}{h\nu_s A}(P_s + P_a^+ + P_a^-) + A_{21}\right]N_2 + \frac{\sigma_{pe2}\Gamma_p}{h\nu_p A}(P_p^+ + P_p^-)N_2 + \frac{\sigma_{pe}\Gamma_p}{h\nu_p A}(P_p^+ + P_p^-)N_3 \quad (1)$$

$$\frac{dN_2(z,t)}{dt} = \frac{\sigma_{sa}\Gamma_s}{h\nu_s A}(P_s + P_a^+ + P_a^-)N_1 - \left[\frac{\sigma_{se}\Gamma_s}{h\nu_s A}(P_s + P_a^+ + P_a^-) + A_{21}\right]N_2 - \frac{\sigma_{pe2}\Gamma_p}{h\nu_p A}(P_p^+ + P_p^-)N_2 + A_{32}N_3 \quad (2)$$

and by conservation, $N_3 = N_t - N_1 - N_2$, where $N_1$, $N_2$ and $N_3$ are the populations densities of the ground level, metastable level and pump level respectively and $N_t$ is the total $Er^{3+}$ density. The superscript + designates pump and ASE copropagating with the signal, and − when they counterpropagate to the signal. The absorption (a) and emission (e) cross-sections of the pump (p) and signal (s) are $\sigma_{s,p;a,e,e2}$. With pumping into the metastable level with ($\lambda_p = 1450$–$1500$ nm), the amplifier behaves as a two level system with the pump emission cross-section $\sigma_{pe2} = \sigma_{pe}$; pumping into other absorption bands (e.g. $\lambda_p = 980$ mn) have $\sigma_{pe2} = 0$. Other parameters are the fiber core area, A, the signal-to-core overlap, $\Gamma_s$, and the pump-to-core overlap, $\Gamma_p$. No other effects of the radial distribution of ions or the optical mode are included here, since it is assume that the erbium ions are confined to the region of the optical mode's peak intensity and $\Gamma_{s,p}$ are small. The nonradiative transition rate from level 3 to 2 is $A_{32}$ and the radiative transition rate from level 2 to 1 is $A_{21}$. In calculating the behavior of concatenated fiber amplifiers, the parameters for erbium in alumino-silicate glass, pumped at $\lambda_p = 1480$ nm, and amplifying a signal at $\lambda_s = 1545$ nm were used. Table 1 summarizes the material parameters and typical fiber parameters applicable to fiber amplifiers.

TABLE 1

| Fiber-Amplifier Parameters Used in Calculations | |
|---|---|
| $\lambda_p = 1480$ nm | $\Delta\nu = 3100$ GHz (25 nm) |
| $\lambda_s = 1545$ nm | $A_{21} = 100$ s$^{-1}$ |
| $\sigma_{pe} = \sigma_{pe2} = 0.42 \times 10^{-21}$ cm$^2$ | $A_{32} = 10^9$ s$^{-1}$ |
| $\sigma_{pa} = 1.86 \times 10^{-21}$ cm$^2$ | $A = 12.6 \times 10^{-8}$ cm$^2$ |
| $\sigma_{se} = 5.03 \times 10^{-21}$ cm$^2$ | $\Gamma_s = \Gamma_p = 0.4$ |
| $\sigma_{sa} = 2.85 \times 10^{-21}$ cm$^2$ | |

The convective equations describing the spatial development of the pump, signal and ASE in the fiber are:

$$\frac{dP_p^\pm(z,t)}{dz} = \mp P_p^\pm \Gamma_p (\sigma_{pa}N_1 - \sigma_{pe2}N_2 - \sigma_{pe}N_3) \mp \alpha_p P_p^\pm \quad (3)$$

$$\frac{dP_s(z,t)}{dz} = P_s \Gamma_s (\sigma_{se}N_2 - \sigma_{sa}N_1) - \alpha_s P_s \quad (4)$$

$$\frac{dP_a^\pm(z,t)}{dz} = \quad (5)$$

$$\pm P_a^\pm \Gamma_s (\sigma_{se}N_2 - \sigma_{sa}N_1) \pm 2\sigma_{se}N_2\Gamma_s h\nu_s \Delta\nu \mp \alpha_s P_a^\pm$$

The second term in (5) is ASE power produced in the amplifier per unit length within the amplifier homogeneous bandwidth $\Delta\nu$ for both polarization states. The loss terms, $\alpha_{s,p}$ represent internal loss of the amplifier, which is relevant in the case of the distributed optical amplifier whose length is equal to the span length and $\alpha_{s,p}$ are the usual signal and pump attenuation in the transmission fiber.

Equations (1)–(5) are solved for steady-state conditions where $dN_i/dt = 0$, to yield the output ASE power and the amplified signal with amplifier saturation. The amplifier gain is calculated as $G = P_s(l)/P_s(0)$ and the spontaneous emission noise factors in the forward and backward directions are defined as $n_{sp}^+ = P_a^+(l)/(2h\nu_s\Delta\nu(G-1))$ and $n_{sp}^- = P_a^-(0)/(2h\nu_s\Delta\nu(G-1))$. The evolution of the signal and noise in the transmission system is computed numerically. However, simplifications to these equations yield convenient expressions for the achievable gain and amplifier noise figure. $F=2n_{sp}$. In the case of pumping into the metastable level ($\sigma_{pc2}=\sigma_{pc}$), and in the limits where $P_s=0$, and $(P_p^- + P_p^-) >> P_{th} = h\nu_p A A_{21}/\sigma_{pa}\Gamma_p$, it is derived from equations (1) and (2) that $$G_{max}(1,\lambda_p,\lambda_s) = \exp\left[1 \frac{r_p(\lambda_p) - r(\lambda_s)}{1 + r_p(\lambda_p)}\right] \quad (6)$$

$$F_{min}(\lambda_p,\lambda_s) = r_p(\lambda_p) - r(\lambda_s) \quad (7)$$

where the dependence $G_{max}$ and $F_{min}$ on $\lambda_p$ and $\lambda_s$ appear explicitly in the cross-section ratios, $r_p = \sigma_{pa}/\sigma_{pc}$ and $r = \sigma_{sa}/\sigma_{se}$. In measurements of the wavelength dependence of amplifier gain, the physical length of the amplifier, $L_{amp}$, is constant and $1 = L_{amp}\Gamma_s\sigma_{se}(\lambda_s)N_T$ varies with signal wavelength. Consequently, it is desirable to refer 1 to the value at some reference signal wavelength, i.e., $l_{so}=l(\lambda_{so})$, and $G_{max}$ is then:

$$G_{max}(l_{so},\lambda_p,\lambda_s) = \exp\left[\frac{\sigma_{se}(\lambda_p)}{\sigma_{se}(\lambda_{so})} l_{so} \frac{r_p(\lambda_p) - r(\lambda_s)}{1 + r_p(\lambda_p)}\right] \quad (8)$$

Figure 1:
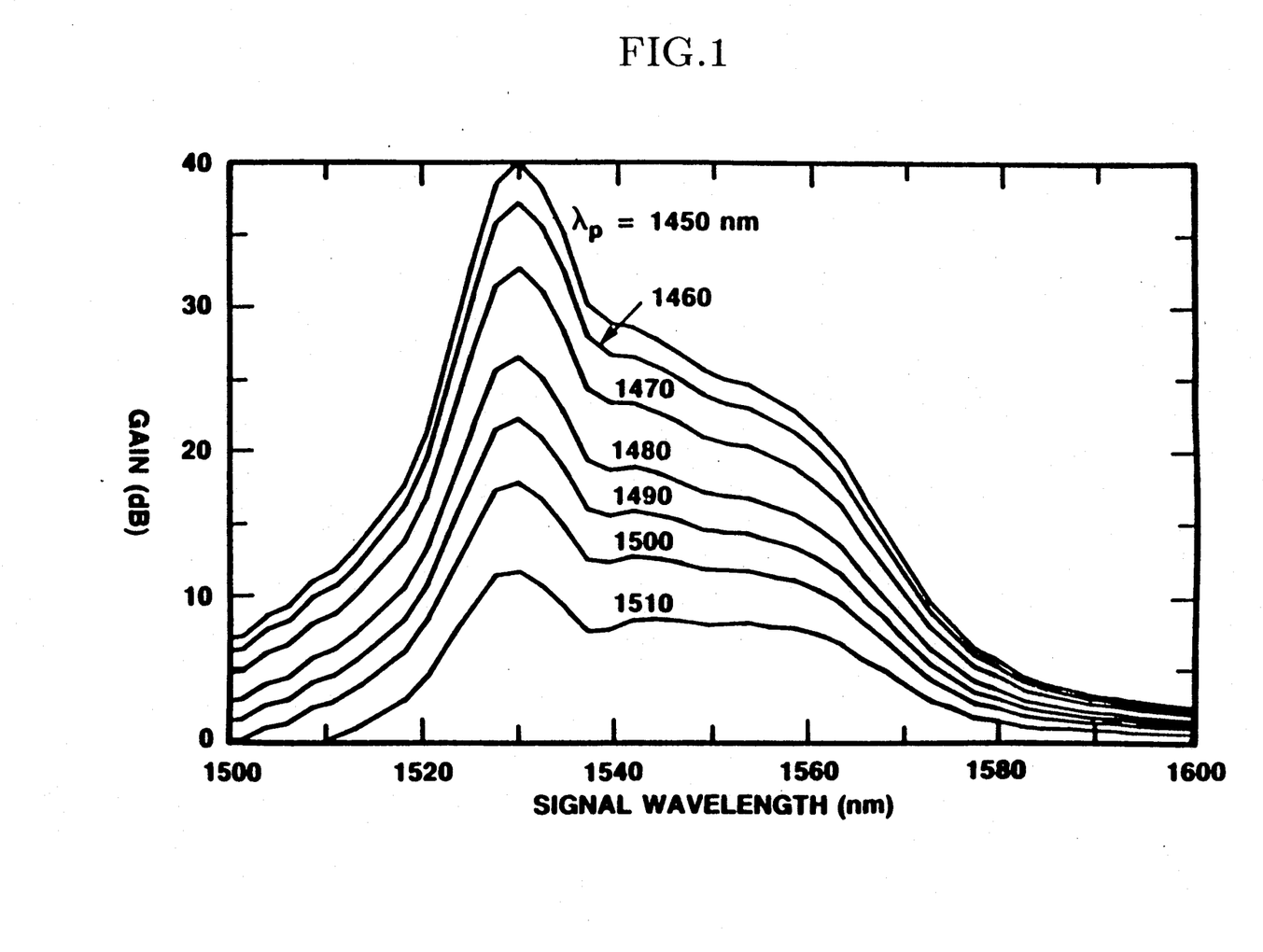
FIGS. 1 and 2 are curves of maximum gain (Gmax) and minimum noise (Fmin) of an $Er^{3+}$ fiber amplifier with $Al_2O_3$—$SiO_2$ core, $l=9$ at $\lambda_{so}=1531$ nm; a pump wavelength of 1450 nm $<\lambda_p<$ 1510 nm and a signal wavelength of 1500 nm $<\lambda_s<$ 1600 nm.
Figure 2:
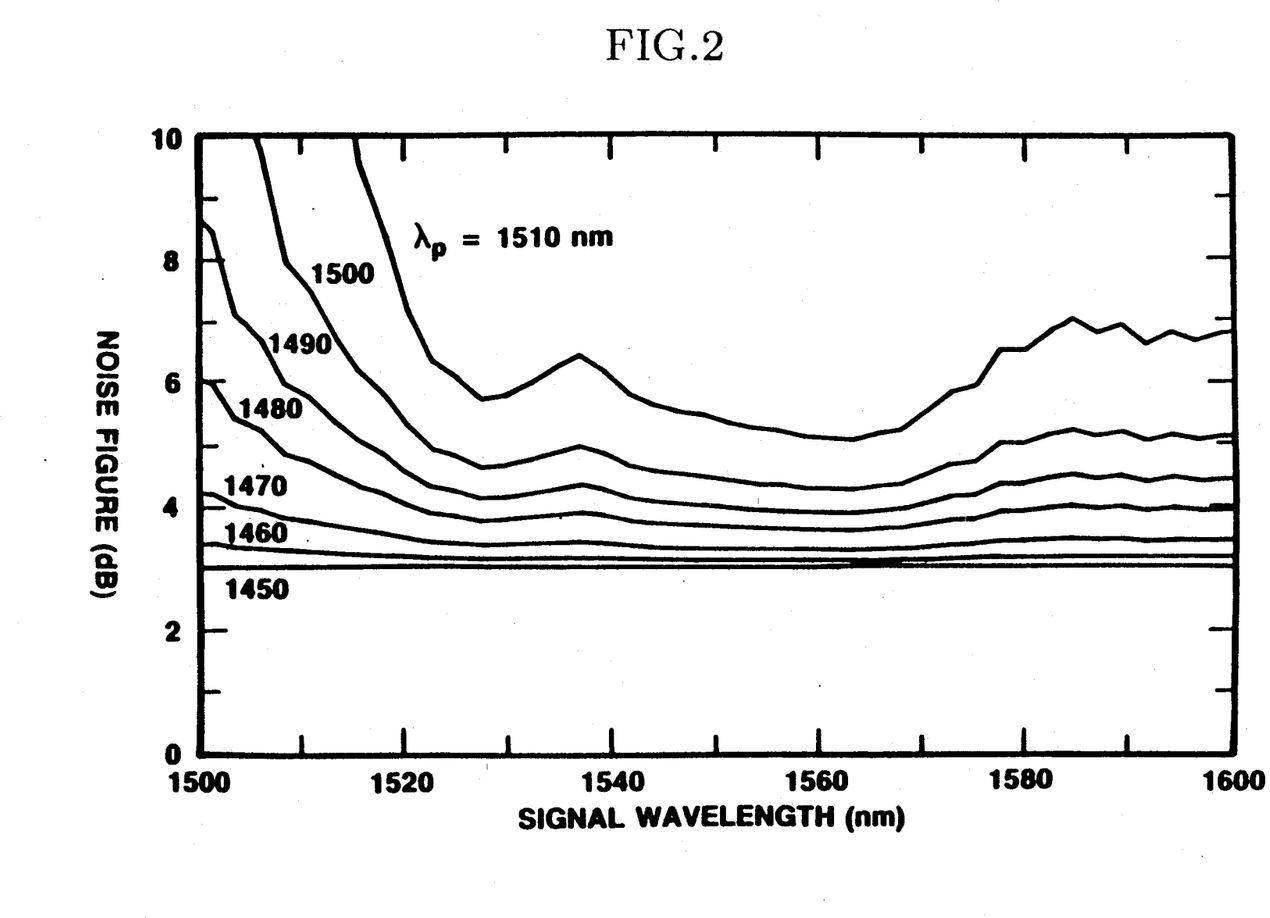

Equations (7) and (8) are useful in that they give the minimum noise figure and the maximum gain of an erbium-doped optical amplifier having cross-section ratios calculated from the absorption and fluorescence spectra of the amplifier. These values of $G_{max}$ and $F_{min}$ are the upper and lower bounds to those values computed numerically for an amplifier with the same 1, $\lambda_p$ and $\lambda_s$, but operating where the signal and ASE are present and the amplifier does not have maximum inversion. FIGS. 1 and 2 show the calculated $G_{max}$ and $F_{min}$ for an alumino-silicate glass host with $\lambda_p$ ranging from 1450 nm to 1510 nm, and $l_{so}=9$ for $\lambda_{s0}=1531$ nm. See IEEE J. Lightwave Tech. Vol. 7, No. 5, pp. 835-845 (1989), "Amplification of Spontaneous Emission in Erbium-doped Single-mode Fibers" by E. Desurvire et al. Pumping at short wavelengths enables high amplifier inversion resulting in high gain and a low noise figure. Quantum-limited signal amplification, i.e., $F=3$ dB, is practically achieved by pumping at $\lambda_p=1450$ nm. In a recent experiment, a noise figure $F=4.1$ dB was reported with 1493 nm pumping which agrees closely to $F_{min}=4.3$ dB predicted for the alumino-silicate glass host.

Figure 3:
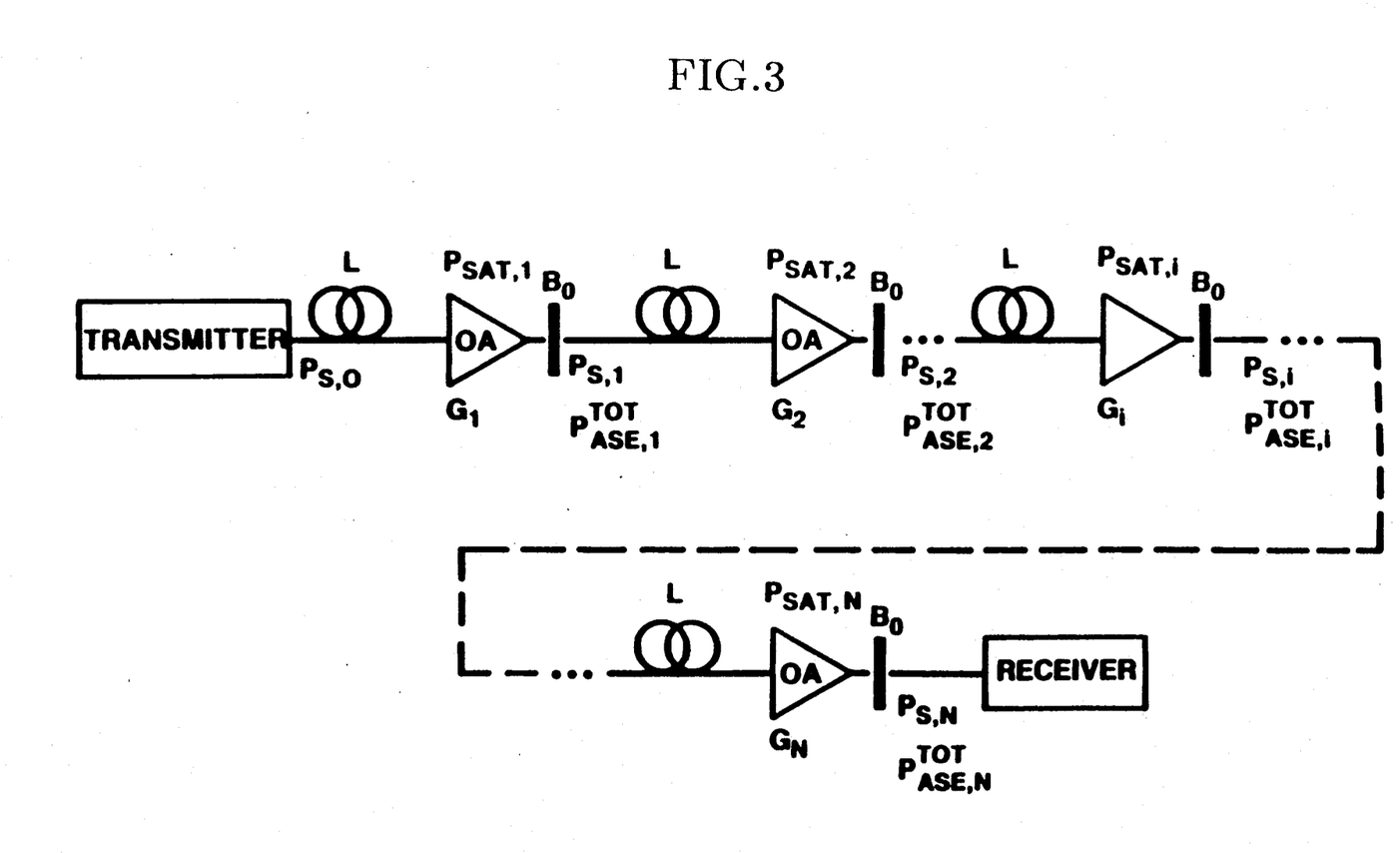
FIG. 3 is a schematic of a concatenated amplifier system wherein amplifier gain is Gi, saturation power is Psat, the total loss in a transmission span is L, and the optical filter bandwidth is Bo.

In a transmission system, the optical amplifiers are concatenated with the transmission fiber, and optical filters are inserted to reject the ASE outside of the signal band. FIGS. 1 and 2 are curves of maximum gain and minimum noise of an erbium-doped fiber amplifier with an $Al_2O_3$—$SiO_2$ core. The system, shown in FIG. 3, is generalized to include the variation in the gain and output signal power of each stage caused by the build-up of the ASE power, $P_{ase,i}^{tot}$. In the case of the fiber-amplifier, which will be discussed first, the amplifiers are assumed to be the same, and the spontaneous emission noise factor, $n_{sp}$, is obtained from equations (1)-(5). The loss of each span, L, and the normalized filter bandwidth $b=B_0/\Delta\nu$, are kept constant. The optical filter bandwidth, $B_o = 1$ nm (126 GHz) is a compromise between minimizing the ASE power outside the signal bandwidth, and ensuring that the bandwidth of the cascaded amplifiers remains large enough for Gb/s signals. A rectangular shaped ASE optical spectrum after the optical filter is assumed in the noise calculation. Later, the effects of non-ideal filtering on the ASE spectrum and system gain will be discussed.

In a system of concatenated lumped fiber amplifiers, gain saturation of the optical amplifiers at any stage is caused by the extraction of power from the amplifier by the ASE, and amplification of the signal and of the ASE from previous stages. At the ith amplifier then the total output powers of the ASE and signal are:

$$P_{ase,i}^{tot} = LG_iP_{ase,i-1}^{tot} + bP_{a,i}^+(G_i,n_{sp,i}) \quad (9)$$

$$P_{s,i} = LG_iP_{s,i-1} \quad (10)$$

with $P_{ase,0}^{tot}=0$; $P_{s,0}$ is the transmitter output power. Optical isolators at each amplifier prevent the backward propagation of ASE through the system. The transmitter power, $P_{s,0}$ could be produced with a power optical amplifier placed in front of the transmitter, but it is assumed that the amplifier is strongly saturated and $P_{a,0}^+$ is negligible. Also, $P_{s,0}$ could be the total power of a WDM signal if the wavelength spacing is not too large to cause significant differences in the net gain of each channel.

The behavior of the fiber-amplifier, and consequently the concatenated amplifiers, depends on L, $\lambda_p$, $\lambda_s$, and on the power and direction of the pump. For example, the noise factor of amplifiers having co-propagating pump ($P_p^+ > 0$, $P_p^- = 0$) is typically lower than those having counterpropagating pumps ($P_p^+ = 0$, $P_p^- > 0$) because of higher population inversion at the input. Also, the amplifier saturation power increases with pump power, even though the highest gain is $G_{max}$ once the maximum inversion is achieved.

Figure 4:
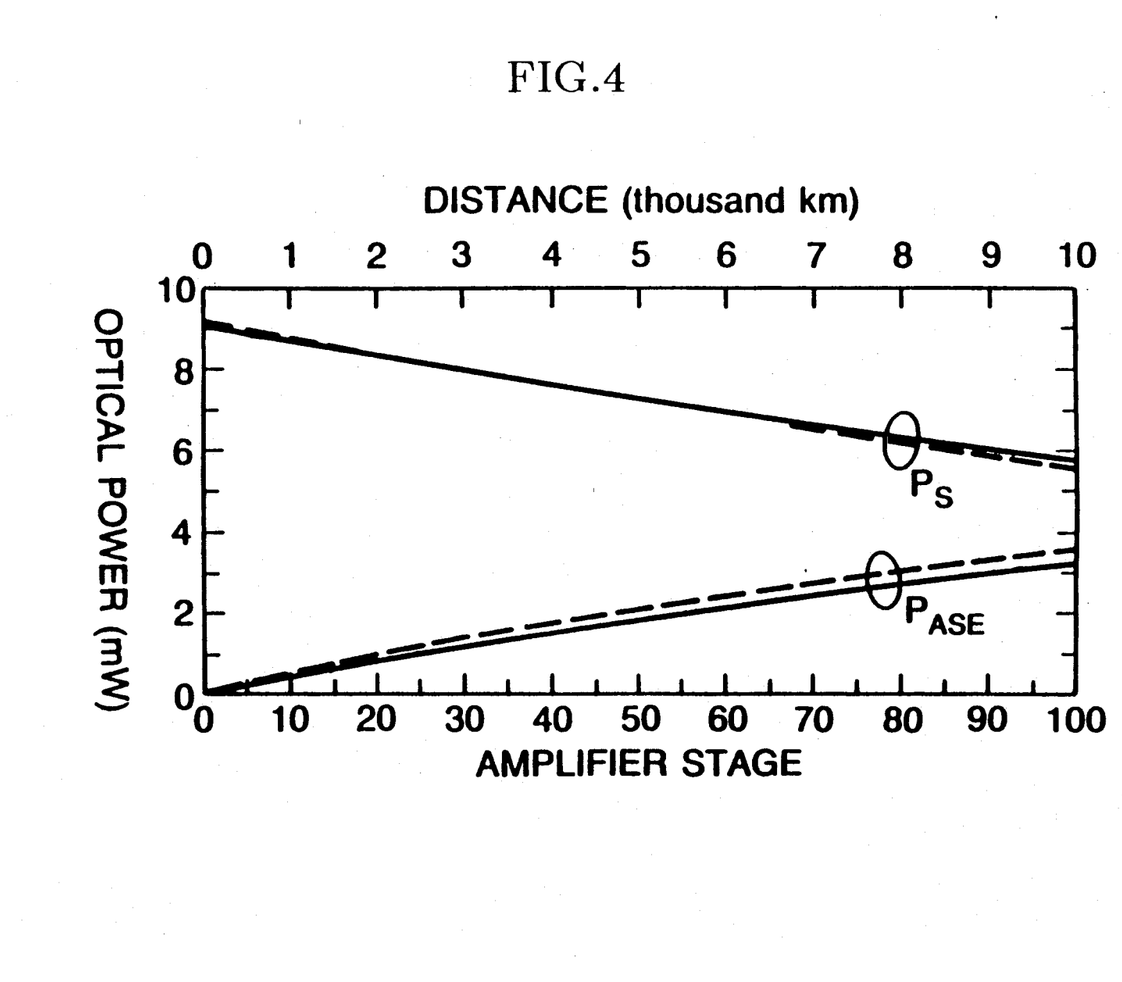
FIG. 4 is a plot of signal power (Ps) and amplified spontaneous emission power ($P_{ase}$) of concatenated lumped optical amplifiers for copropagating (—) and counterpropagating (- - -) pump signals where pump power is 30 mW, Pso=9 mW, b-0.04 and L=0.001.

FIG. 4 shows the output signal power and the total output ASE power of a concatenated amplifier system for both copropagating and counterpropagating pump and for typical amplifier conditions, L=30 dB span attenuation and a normalized bandwidth of b=0.04. The span attenuation was chosen as representing 25 dB loss in 100 km of fiber and a 5 dB margin for amplifier insertion loss. The bandwidth corresponds to a 1 nm filter for an amplifier homogeneous linewidth of 25 nm. With a transmitter signal power, $P_{so}=9$ mW, the saturated gain of every optical amplifier is 30 dB, which is 5 dB lower than $G_o=35$ dB. The long transient response time of gain saturation in erbium-doped fiber-amplifiers enables them to operate saturated in Gb/s systems without causing patterning or crosstalk penalties. See Opt. Lett., Vol. 14, No. 16, pp. 880-882 (1989) "Transient Gain and Crosstalk in Erbium-doped Fiber Amplifiers" by C. R. Giles, et al. Additionally, in these highly saturated amplifiers good conversion efficiency of the pump power into signal power is achieved; of the 30 mW pump in this example, 30% is converted to amplified signal.

In the transmission system, the ASE grows nearly linearly, causing the output signal power of successive amplifiers to decrease. After 10,000 km, with copropagating-pump amplifiers, the signal is reduced to 5.7 mW, and the ASE power is 3.25 mW in a 1 nm bandwidth. With the counterpropagating pump, the amplifier noise figure is slightly higher, resulting in $P_{ase}^{tot}=3.65$ mW at the output of the final amplifier. At the high powers in these optically amplified systems, Brillouin scattering and self-phase modulation in the transmission fiber could cause further signal degradation. Constant amplitude signal transmission (frequency-shift keying or phase-shift keying), or soliton transmission, may suppress degradation caused by these fiber nonlinearities, but the degradation caused by the growth of ASE and the loss of signal power is unchanged. One means of reducing the accumulated ASE is to decrease the amplifier spacing while maintaining the total amplifier gain in the system, $G_{system}$, equal to the fiber and component losses. Then the ASE optical power at the receiver is proportional to $N(G_{system}^{1/N} - 1)$, where N is the number of amplifiers in the system, each having gain $G_{system}^{1/N}$. The noise performance improves for large N and in the limit of distributed amplification where the transmission fiber is also the gain medium, the ASE power is proportional to $\ln(G_{system})$.

Figure 5:
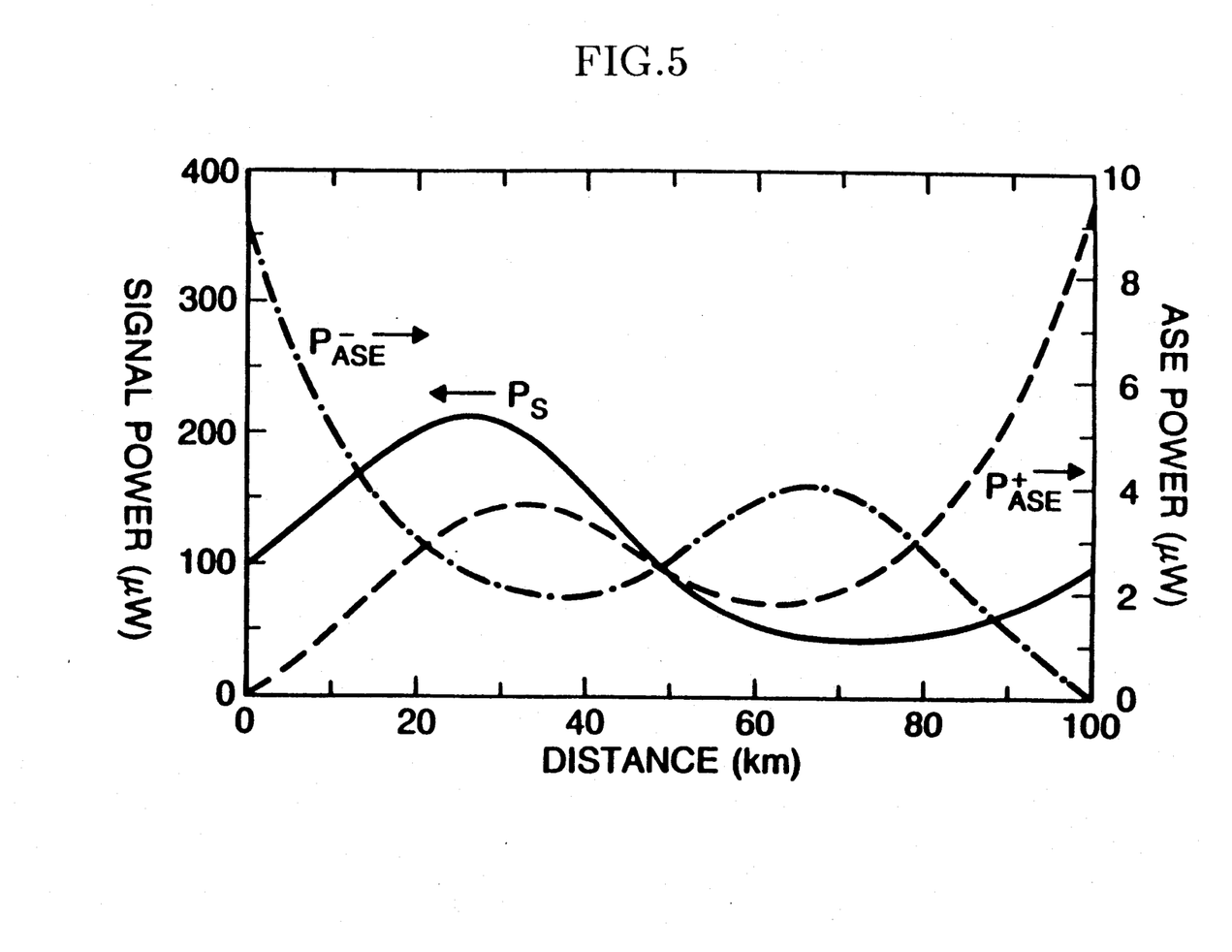
FIG. 5 is a plot of signal power (Ps) and amplified spontaneous emission power ($P_{ase}$) in a bidirectionally-pumped distributed fiber amplifier where $P_p^+ = P_p^- = 30$ mW, $L_{amp} = 100$ km, $N_{Er}3+ = 8.3 \times 10^{14}$ cm$^{-3}$, $P_{s,0} = 0.1$ mW and b=0.04; the arrows identify the associated scale.

We refer now to a system having concatenated distributed fiber amplifiers. Distributed amplifiers are known to have the potential of attaining very low noise figures because the signal level is kept relatively high throughout the amplifier. For the erbium amplifier, where the characteristic length is $1/\Gamma_s \sigma_{se} N_t$, the dopant density can be reduced to yield very long amplifiers that are themselves the transmission fiber. The amplifier length can also be increased by confining the erbium to a small core diameter to reduce the overlap between the signal and the doped region. Loss in the fiber from Rayleigh scattering, OH absorption, impurities, and the like, limit the maximum length that can be used in a distributed amplifier, and is incorporated in the model with the loss terms $\alpha_s$ and $\alpha_p$ in equations 3-5. FIG. 5 illustrates a 100-km long distributed amplifier, with a normal attenuation loss of 0.25 dB/km ($\alpha_s = \alpha_p = 5.76 \times 10^{-5}$ m$^{-1}$) and bidirectionally pumped with $P_p^- = P_p^- = 30$ mW. To achieve unity gain, the fiber is doped with $N_t = 8.3 \times 10^{14}$ cm$^{-3}$, which is approximately a thousand times less than in a conventional lumped amplifier. The input signal power is 100 $\mu$W but is not constant in the distributed amplifier, rather it grows at the two ends where the pump power is large and is attenuated in the middle portion of the amplifier. If required by other constraints of the system, the fluctuation in the signal level can be reduced by decreasing the erbium concentration and increasing the pump power to achieve constant inversion in the amplifier. At these higher pump powers ($P_p > 50$ mW), Raman gain is significant, and is easily incorporated into equations 3-5 by adding terms having pump-power-dependent gain coefficients.

Figure 6:
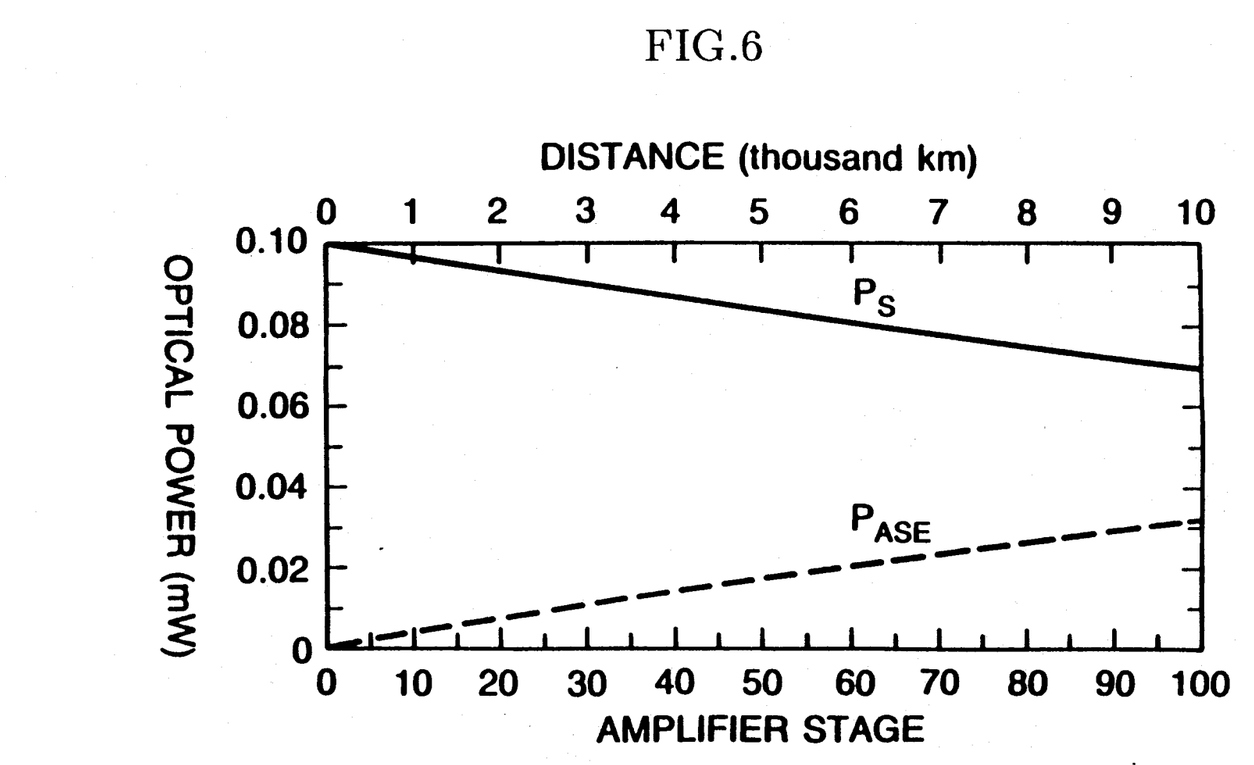
FIG. 6 is a plot of signal power (Ps) and amplified spontaneous emission power ($P_{ase}$) in concatenated distributed fiber amplifiers of the type illustrated in FIG. 4.

FIG. 6 illustrates the propagation of the ASE and signal through a series of concatenated distributed amplifiers where the output signal power from each span is kept constant at $P_{s,0} = 0.1$ mW and there is no coupling loss between amplifiers. The distributed amplifier used in this example is the bidirectionally pumped amplifier of FIG. 5 with the span length of 100 km. The principal advantage of the distributed amplifier, low ASE, is clearly observed by comparing FIG. 5 with the lumped amplifier results of FIG. 3, where the ASE power is two orders of magnitude higher. One disadvantage of the distributed amplifier is that the pump power requirements are approximately doubled because both the relatively high-power pump and the signal experience loss in the transmission fiber. Also, since the signal power is relatively high throughout the system, nonlinearity of the transmission fiber may be more important in this embodiment rather than in the embodiment using lumped amplifiers. This could be advantageous for soliton transmission which relies upon self-phase modulation to sustain the soliton, however, it could cause pulse broadening for conventional optical pulse transmission.

In accordance with the principles of the invention, concatenated lumped amplifiers configured to operate in their saturation mode can be configured in several ways to provide a desired system performance. Beginning with the assumptions of local homogeneous saturation of the gain coefficient g, i.e., $g = (1/(1 + P/P_{sat}))$, and uniform pumping of the amplifier, an implicit form of the amplifier gain is:

$$G = G_o \exp[(1 - G) P_{in}/P_{sat}] \quad (11)$$

where $G_o$ is the unsaturated gain and $P_{in}$ is the total power at the input to the erbium-doped fiber. See A. E. Siegman, "Lasers", University Service Books (Mill Valley, Calif.) 1986. With this definition of $P_{sat}$, $P_{out} = 0.69 P_{sat}$ when $G = G_o/2$, $G_o >> 1$. Self-saturation from the ASE produced within an amplifier is not included, but the ASE is propagated through the concatenated spans and causes saturation of following amplifiers. The total power and the signal power at the output of the doped fiber of the ith amplifier is then:

$$P_{out,i} = LG_i P_{out,i-1} + 2n_{sp}(G_i - 1)h\nu_s B_o \quad (12)$$

$$P_{s,i} = LG_i P_{s,i-1} \quad i = 1, n$$

where $P_{out,0} = P_{s,0}$. The filter bandwidth at each stage is $B_o$. The spontaneous emission noise factor of each amplifier is assumed to be constant, which is a reasonable approximation to the results obtained from the simulations with the complete fiber amplifier model. The unsaturated gain and saturation powers are determined from the fiber design and pump powers. Typically, the fiber amplifier is operated where the small-signal gain varies slowly with pump power, and the saturation power can be regulated by changing the pump power. Consequently, in the examples that follow, $G_{o,i} = G_o$ (a constant), and $P_{sat,i}$ is a parameter that can be adjusted in order to obtain system goals. The roles of saturation power and unsaturated gain are easily reversed, i.e., modeling $P_{sat}$ = constant and variable $G_{o,i}$, which more closely resembles the behavior of semiconductor optical amplifiers when regulating the injection current.

Figure 7:
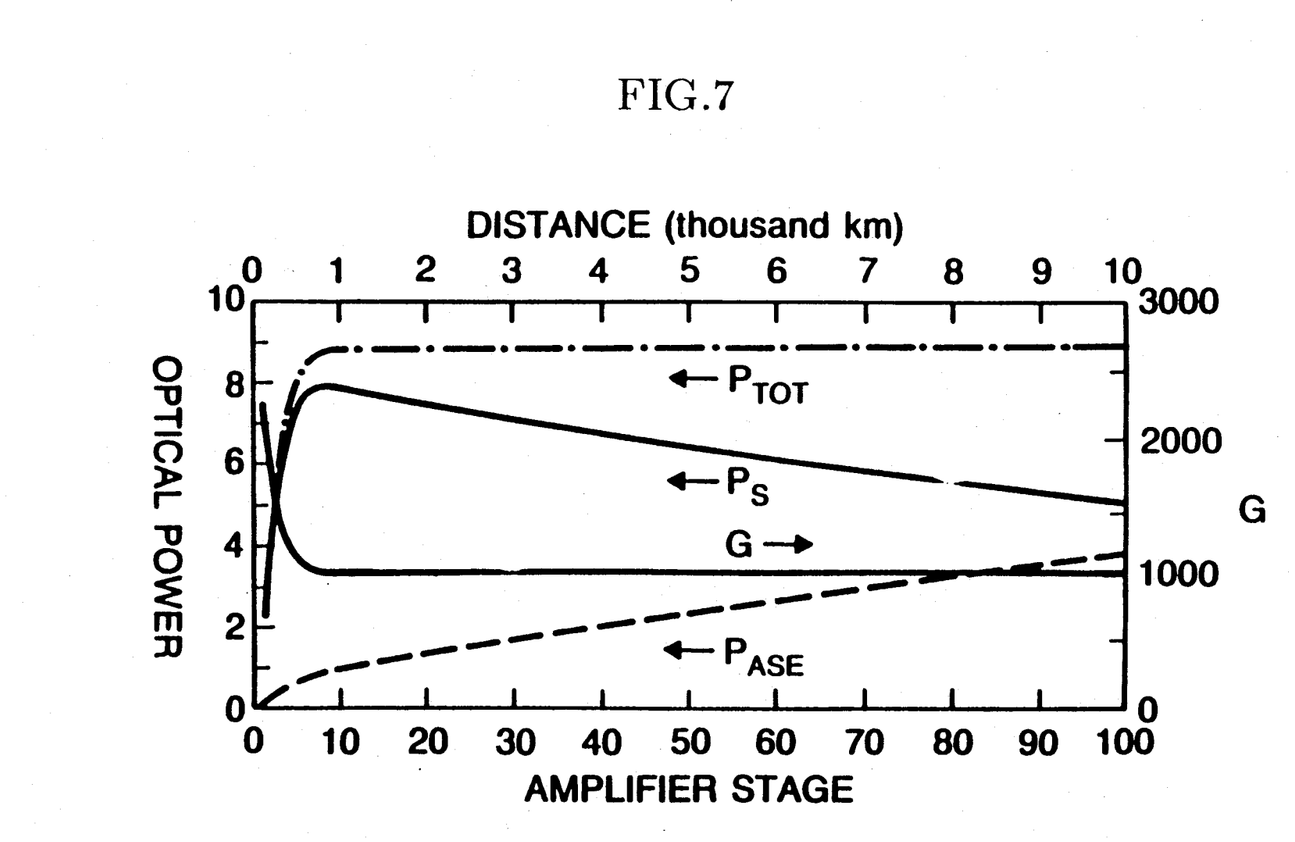
FIG. 7 is a plot of total power ($P_{TOT}$), signal power (Ps), gain (G) and amplified spontaneous emission power ($P_{ase}$) of a free-running concatenation of lumped amplifiers where $G_o=35$ dB, $P_{sat}=8$ mW, $LG_o=3$, $P_{so}=1$ mW, and $N_{sp}=1.3$; the arrows identify the associated scale.

Three embodiments of concatenated fiber-amplifier systems are considered here. The first embodiment is the "free-running" system described previously where there is no regulation of total output power or output signal power. FIG. 7 illustrates a plot of $G_i$, $P_{ase,i}$, $P_{s,i}$ and $P_{out,i}$ for 100 concatenated free-running amplifiers having $G_0 = 35$ dB, $P_{sat} = 8$ mW and $LG_o = 3$. It is to be noted that if $LG_o = 1$, as would be the case if saturation effects were ignored, amplifier saturation would cause the signal to rapidly decay by the factor $$\prod_{i=1}^{N} LG_i, \quad LG_i < 1.$$

To illustrate the free-running behavior of the system, the transmitter power is only 1 mW. After the first amplifier, the signal power is larger than $P_{s,0}$, but as the gain saturates and ASE builds up, the signal declines by the eighth amplifier.

The second embodiment is to keep the total output power constant through the system, i.e., $P_{out,i} = P_{s,0}$.

Substituting this into equation 12, the gain of each stage is $$G = \frac{P_{s,0} + 2n_{sp}h\nu_s B_o}{2n_{sp}h\nu_s B_o + LP_{s,o}} \tag{13}$$

and in the limit of $2n_{sp}h\nu B_o \ll P_{s,o}$, $G = 1/L$ and $$P_{sat} = \frac{(1-L)P_{s,o}}{\ln(LG_o)} \tag{14}$$

Figure 8:
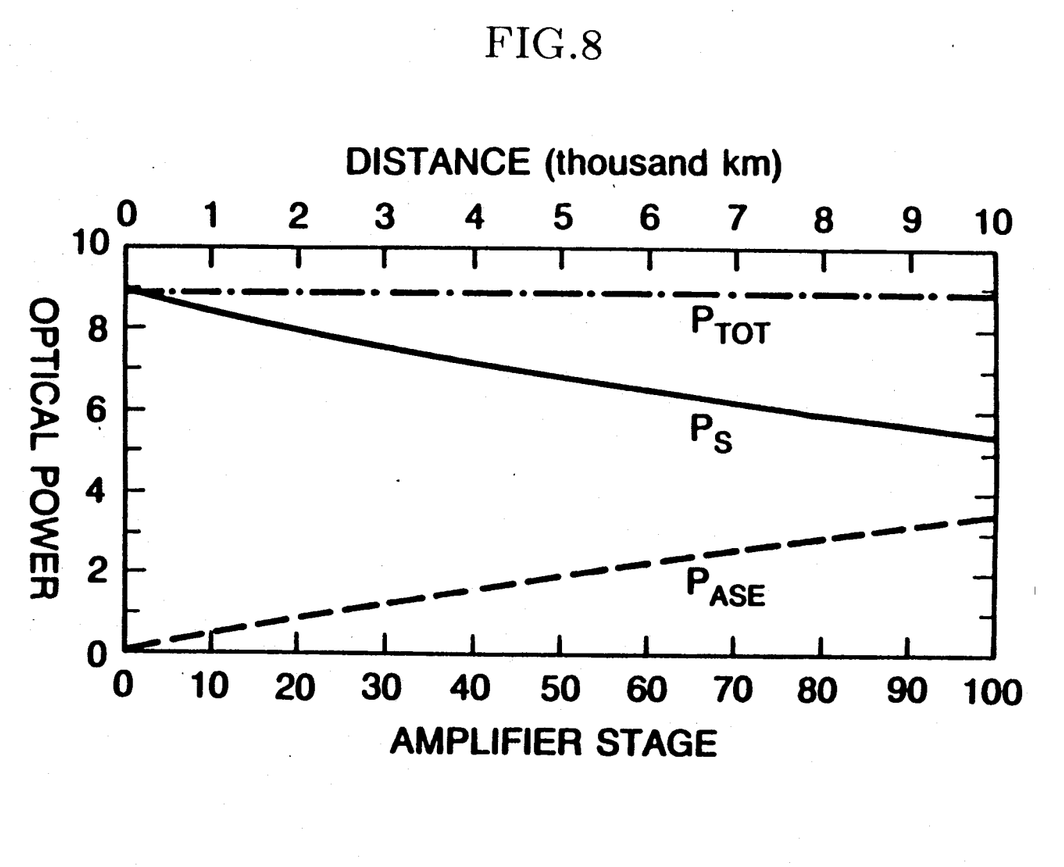
FIG. 8 is a plot of total power ($P_{TOT}$), signal power (Ps) and amplified spontaneous emission power ($P_{ase}$) of concatenated lumped optical amplifiers with constant total output power where $G_o=35$ db, $P_{sat}=8$ mW, $LG_0=3$, $P_{s,0}=8.9$ mW, and $N_{sp}=1.3$.

FIG. 8 is a plot of the signal and ASE evolving through 100 amplifiers for a transmitter power $P_{s,o} = 8.9$ mW. This condition is a special case of the free-running amplifiers where $P_{s,o}$ has been selected so that the saturated gain is nearly equal to the span loss, beginning with the first amplifier. The difference here is that $P_{sat,i}$ may be regulated to maintain $P_{out,i} = P_{s,0}$ in the event that conditions of the system change. However, the signal power still diminishes with distance because the addition of ASE from each amplifier prevents the gain from exactly compensating for the loss. After 100 amplifiers, the signal-to-noise is significantly better than the $P_{s,o} = 1$ mW free-running case, at the expense of higher $P_{s,o}$ which may be achieved using a power amplifier at the transmitter.

A final embodiment of system supervision can have constant signal power at the output of each amplifier. Although this is not the most efficient mode of operating the system to convert the maximum amount of pump power to signal, it still is likely the preferred method of operation. Now $P_{s,i} = P_{s,0}$, consequently $LG_i = 1$ and $$P_{out,i} = P_{s,0} - i 2n_s(G-1)h\nu_s B_{oa} \tag{15}$$

Rewriting equation 11 to obtain an expression for $P_{sat,i}$, and substituting $P_{in,i} = P_{out,i}/G$, there is obtained $$P_{sat,i} = \frac{1-L}{\ln(LG_o)}\left(P_{s,o} + i 2n_{sp}\left(\frac{1}{L}-1\right)h\nu_s B_o\right) \tag{16}$$

Figure 9:
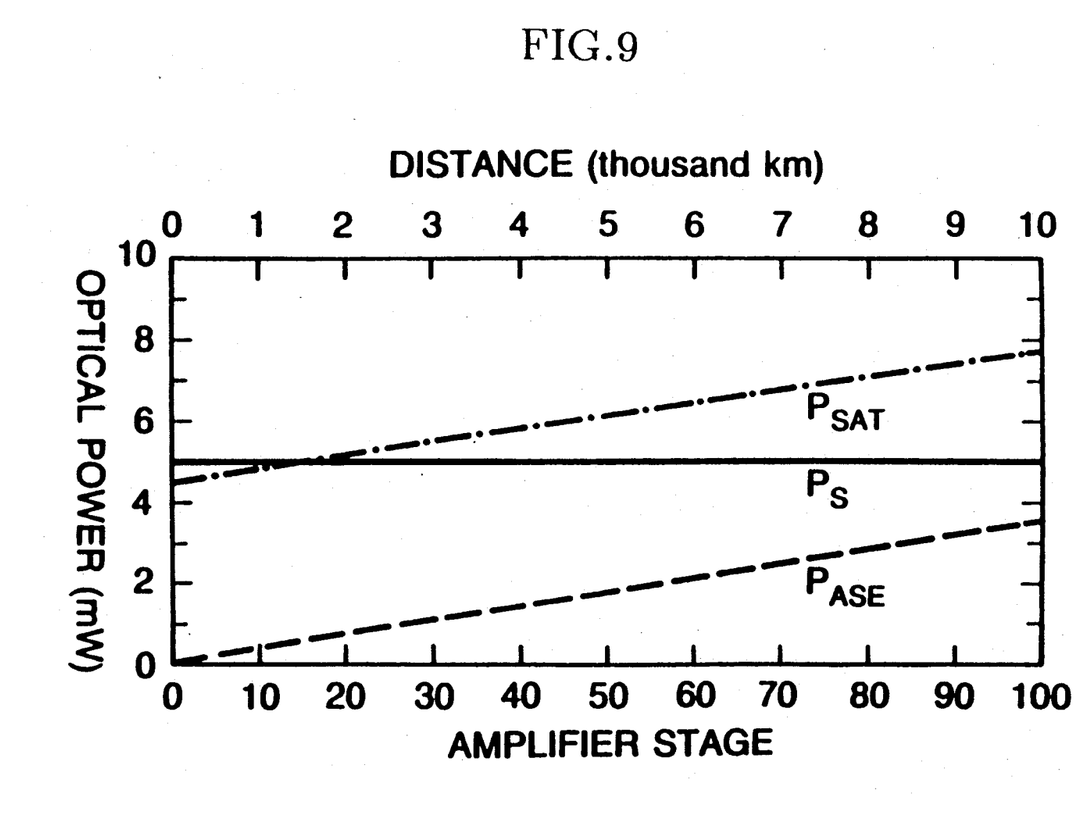
FIG. 9 is a plot of saturated power ($P_{sat}$), signal power ($P_s$) and amplified spontaneous emission power ($P_{ase}$) of concatenated lumped optical amplifiers with constant signal power where $G_o=35$ dB, $LG_o=3$, $P_{s,0}=5$ mW and $N_{sp}=1.3$.

The saturation power of each successive amplifier is increased slightly to compensate for the gain saturation caused by the build-up of the ASE. FIG. 9 illustrates a case where $P_{out,i}$, $P_{ase,i}$ and $P_{sat,i}$ are all increasing down the chain of amplifiers. Here, $P_{sat,1} = 4.6$ mW and at the final amplifier stage $P_{sat,100} = 7.8$ mW. The noise performance is similar to the free-running system when a smaller transmitter power is used but the average saturation power of the amplifiers is higher. Upon comparing the three methods of operation, it appears that issues of system operation, supervision and maintenance, rather than noise, will dictate which method would be preferred for a system. For example, constant signal power monitoring avoids blind operation of a system and enables adequate supervision of the signal's progress at each amplifier stage. Constant power monitoring, however, may reduce the hardware complexity as the signal does not have to be independently sensed.

Once signal and noise have propagated through all the amplifiers, detection at the receiver converts the light into an electrical signal, which for digital data transmission, is a string of "0"s and "1"s corrupted by electrical noise. The electrical noise is the sum of that produced by the receiver electronics, shot noise from the signal and ASE, signal-spontaneous (s-sp) beat noise and spontaneous-spontaneous (sp-sp) beat noise. In quantum-limited detection, the dominant noise is the s-sp beat noise, and where the optical filter bandwidth is considerably larger than the signal bandwidth, significant sp-sp beat noise is present too.

The beat noise degradation can be estimated from the received signal and ASE optical powers. For this purpose, (See IEEE J. Quantum Electron, Vol. QE-16, No. 10, pp. 1073-1081 (1980), "Noise and Error Rate Performance of Semiconductor Laser Amplifiers in PCM-IM Optical Transmission Systems" by Y. Yamamoto; and SPIE Conf. on Fiber Lasers and Amplifiers, Boston, Mass. Paper 1171-32 (1989) "Erbium-doped Fiber Amplifiers for High Speed Fiber-Optic Communication Systems" by C. R. Giles, et al.), it is necessary to know the electrical noise power produced by the beat terms expressed in terms of the signal and ASE photocurrents.

$$I_{s\text{-}sp}^2 = 2I_{ase}I_1 B_e/B_o \tag{17}$$

$$I_{sp\text{-}sp}^2 = I_{ase}^2 B_e/B_o \tag{18}$$

Here $B_e$ is the electrical bandwidth of the receiver and the photocurrents are $$I_{ase} = e\eta P_{ase}\lambda_s/hc \tag{19}$$

$$I_1 = 2e\eta P_s\lambda_s/hc \tag{20}$$

and $\eta$ is the detection quantum efficiency. The electrical bandwidth is approximately one-half the data rate and the optical signal power in the 0's is assumed to be zero. Referring to Bell Sys. Tech. Jour., Vol. 52, No. 1, pp. 117-133 (1973) "Applications of Quantum Amplifiers in Simple Digital Optical Communication Systems" by S. D. Personick, the Q parameter at the receiver, which is related to the achievable bit-error rate (BER) at the receiver is given by:

$$Q = \frac{I_1}{(I_{noise\,"1"}^2)^{\frac{1}{2}} + (I_{noise\,"0"}^2)^{\frac{1}{2}}} \tag{21}$$

where $I_{noise\,"1"}^2$ and $I_{noise\,"0"}^2$ on the total noise powers in a "1" and "0", respectively. For the gaussian noise approximation, $Q = 7.65$ when the $BER = 1 \times 10^{-14}$. From equations 17 and 18, and assuming that other noise effects are small, Q can be expressed in terms of $R_B = B_o/B_e$ and $R_{ase} = P_{ase}/P_s$:

$$Q = \frac{2(R_B)^{\frac{1}{2}}}{(4R_{ase} + R_{ase}^2)^{\frac{1}{2}} + R_{ase}} \tag{22}$$

Most often $R_B$ is specified and $R_{ase}$ is calculated to determine the maximum ASE power that can be tolerated to achieve the desired BER. For example, with 1 nm wide optical filters ($B_o = 126$ GHz at 1545 nm) and $B_e = 1.25$ GHz (2.5 Gb/s data rate), then for $Q = 7.65$, $R_{ase} = 0.74$; the ASE power is approximately 75% of the signal power to achieve a BER floor of $1 \times 10^{-14}$. Slight improvement in the system sensitivity can be achieved by using a narrower bandwidth optical filter at the receiver to reduce the sp-sp beat noise.

All of the previous examples satisfied the criterion of the BER floor $< 10^{-14}$ for a transmission distance of 10,000 km. This performance amply exceeds typical transoceanic requirements of 7500 km, although a large margin may be required as additional impairments may occur, including higher amplifier noise figure, device aging and higher fiber loss. The distributed amplifier example had the best noise performance with $R_{ase} = 0.449$ at 10,000 km even though the input and output signal power of each stage was only 100 µW. The values of $R_{ase}$ for the previous examples of free-running, regulated $P_{out}$, and regulated $P_s$ were 0.74, 0.60 and 0.71 respectively; the low value for constant $P_{out}$ resulted from having a slightly higher transmission power. In soliton transmission systems where the average signal power is several milliwatts, even better signal-to-noise ratios would be achievable in distributed amplifiers. In lumped amplifier systems, the example of constant total power operation gave only slightly better performance than the free-running and constant signal power systems.

The ASE power calculations of the earlier sections were made on the premise that each amplifier had an ideal rectangular bandpass filter and that the amplifier gain spectrum was flat. In practice the filter is not ideal and the gain spectrum in the filter passband is not flat. Thus, the approximate ASE spectral shape at the end of the concatenated amplifiers is determined. First, the ASE spectrum and the gain is assumed to vary linearly within the filter passband, i.e., $P_{ase}$, $G_i \propto 1 + a(\lambda - \lambda_c)$ where a is a measure of the ASE flatness and $\lambda_c$ is the filter center wavelength. Also, identical filters are used at each amplifier, although this would not be true in practice and some averaging of the filter function would occur. In the filter model, a three-stage, double half-wave interference filter is used whose transmission function is $f(\lambda) = 1/[1 + ((\lambda - \lambda_c)/B_1)^6]$ where $B_1$ is the single filter 3-dB bandwidth. This is a standard filter type that can be made with low insertion loss and is a close approximation to the desired rectangular filter. The equivalent optical filter of the concatenated system after N stages has a shape $f(\lambda)^N$, causing the system bandwidth to shrink as compared to a single filter. With this filter function, the 3-dB bandwidth after N stages is reduced by $(\ln 2/N)^{1/6}$ for large N; in the case of N = 100, the system bandwidth is 43.7% less than that of a single filter. Normally, the system optical bandwidth is specified and in the examples of this paper then the single filter bandwidth $B_1 = 2.29 B_o = 2.29$ nm.

Once the filter characteristics are known, the ASE power after N stages is calculated as:

$$P_{ase,N}^{tot}(\lambda) = \sum_{i=1}^{N} P_{ase,i}(\lambda) L^{N-i} f(\lambda)^{N+1-i} \prod_{k=i+1}^{N} G_k(\lambda) \quad (23)$$

In the limiting case of special interest, where the signal power at each amplifier stage is constant, the problem is simplified as $LG_i(\lambda) = 1$. Additionally, if it is assumed that $a = 0$ then the spectrum of the ASE after N stages, $S(\lambda)$, is simply:

$$S(\lambda) = \frac{\sum_{i=1}^{N} f(\lambda)^{N+1-i}}{N} \quad (24)$$

Figure 10:
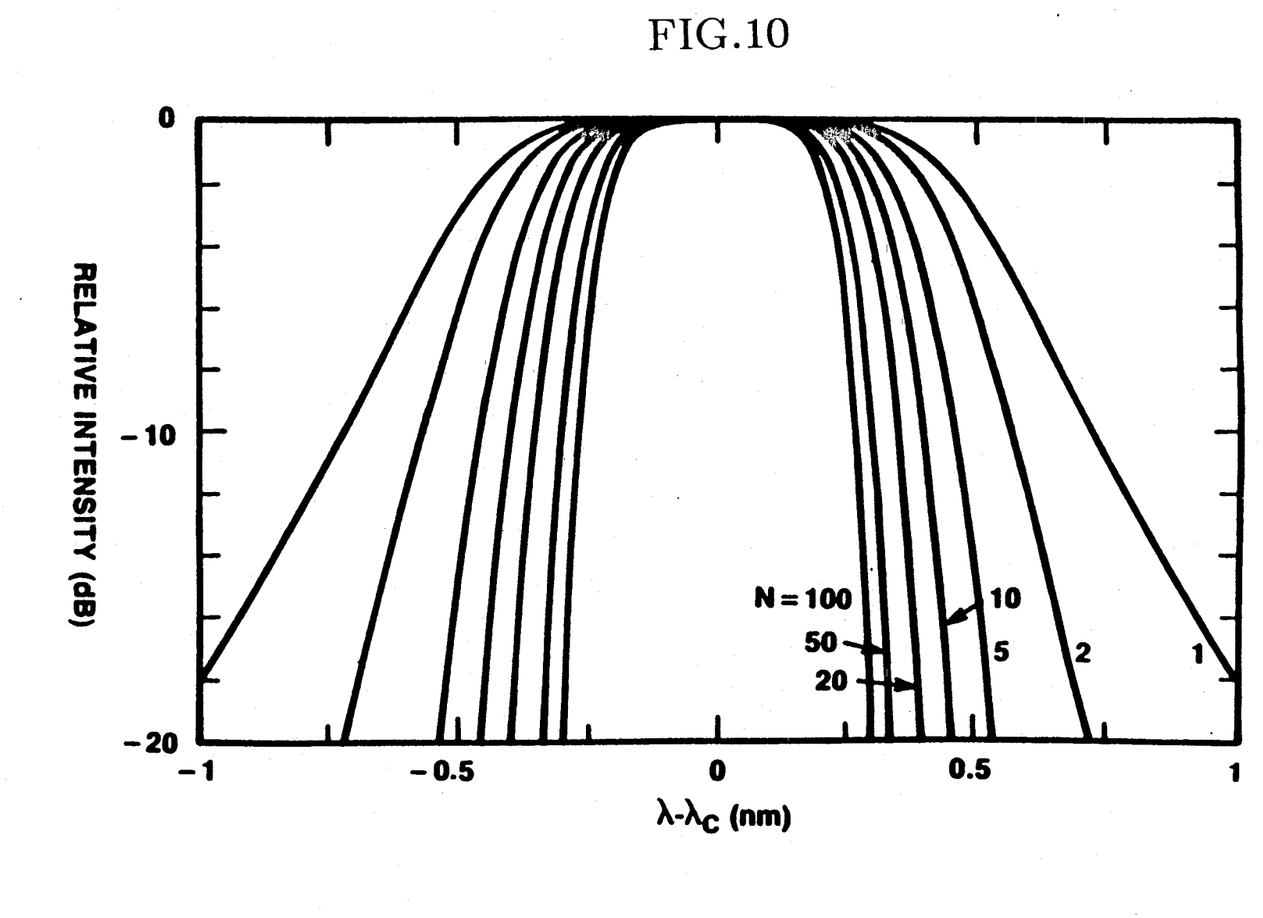
FIGS. 10 and 11 are plots of the evolution of ASE spectrum through a transmission system with 1 nm bandpass optical filters at each stage, FIG. 10 being of flat gain and ASE spectrum within the filter bandwidth and FIG. 11 being with amplifier gain and ASE decreased 5% within the 1 nm filter bandwidth.

FIG. 10 shows the ASE spectrum for 1 to 100 amplifier stages. The ASE spectrum evolves to be very similar in shape to the system transfer function because most of the ASE originates from stages with $N >> 1$, where the system transfer function is only slowly varying. After 30 stages, the ASE spectrum is one-half the width of the spectrum from a single amplifier + filter. Correcting for this in the noise calculations of equations (1)–(5) could be approximated by having $B_o$ being the accumulated ASE bandwidth, not the bandwidth of a single filter.

Figure 11:
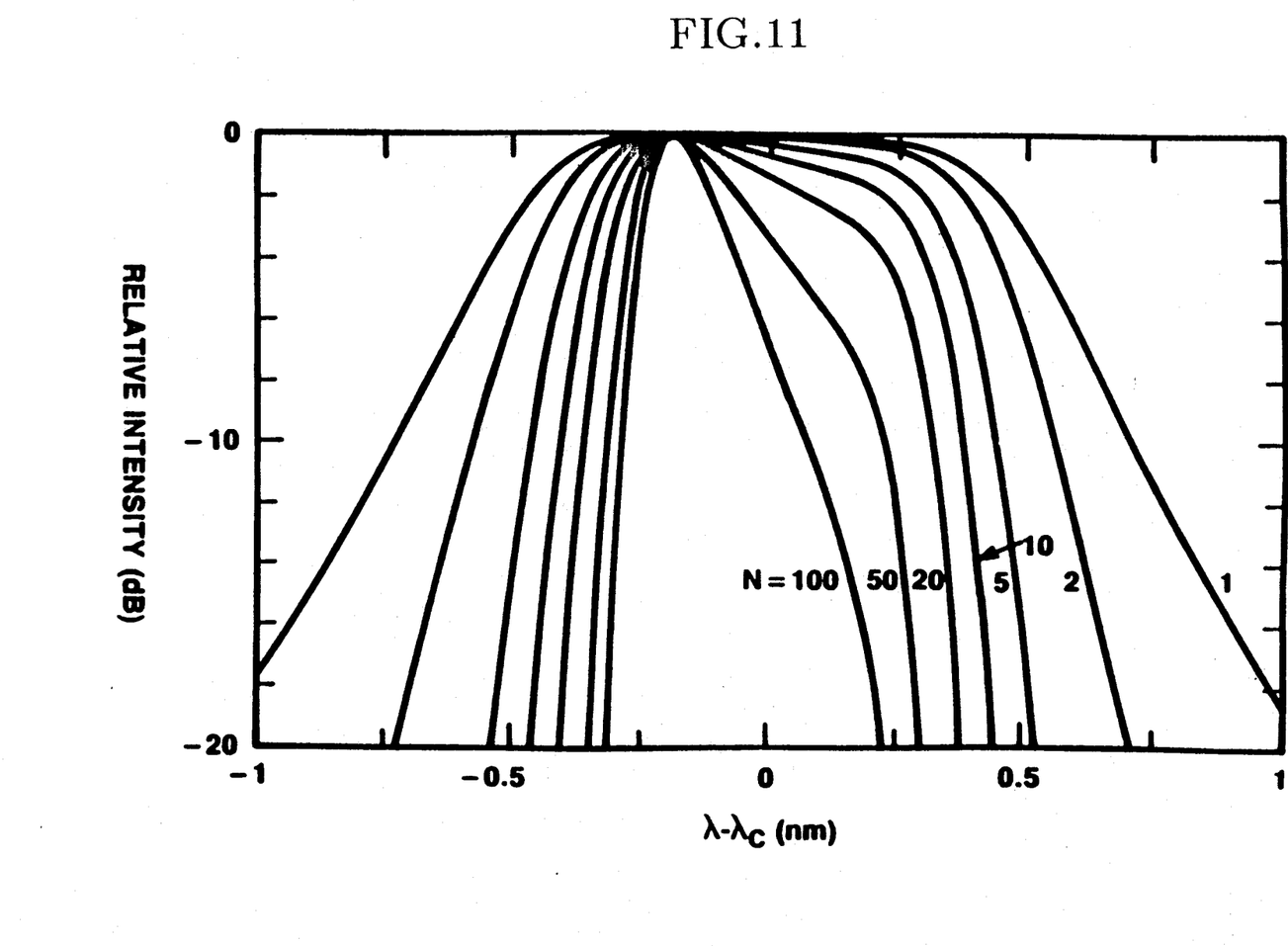

Finally, if the amplifier gain spectrum is not flat through the filter passband, additional distortion of the accumulated gain and ASE spectrum results. FIG. 11 shows the accumulated ASE spectrum where $a = -0.05$, i.e., each amplifier gain decreases by 5% over the filter bandwidth (1 nm). This causes the ASE spectrum to evolve to shorter wavelengths, and become considerably narrower and less flat-topped. After 100 amplifiers, the 3 dB bandwidth of the system is 0.156 of the single-filter bandwidth. The effect of the distortion would be minimized by centering the signal at the peak of the ASE spectrum. Also, this distortion may be corrected by distorting the filter shape slightly to compensate the gain spectrum and improve the net gain flatness over the filter passband.

The propagation of signal and noise is concatenated optical amplifiers is dependent on properties of the amplifier and on the system design. The erbium-doped fiber amplifier is a good candidate for long-distance transmission because of its very low noise and high gain. A rate equation model of the fiber amplifier was used in the simulation of a transmission system. In a 1.5-µm transmission system, system reach beyond 10,000 km for 2.5 Gb/s (Sonet rate) seems possible, discounting the effects of dispersion and transmission fiber nonlinearities. Additional distance can be gained by increasing the launched signal power, by using low-loss transmission fiber, by minimizing the amplifier insertion loss, and/or by reducing the optical filter bandwidth.

Distributed fiber-amplifiers may achieve extremely low-noise operation, at some expense in requiring high pump power and potentially shorter span lengths. In this respect, the erbium-doped distributed amplifier is similar to Raman amplification in transmission fibers.

Three obvious methods of regulating the transmission system are possible and a simple model of optical amplifier saturation was used to simulate system performance. No significant difference is expected in the noise performances of free-running systems, constant-total-power systems, and constant-signal-power systems. Supervisory requirements may favor constant-signal systems as this directly monitors the information transmission, and facilitates extraction of supervisory data in the signal. An advantage of the free-running system is that it always equilibrates to convert the maximum amount of pump power into signal power, achieving the best possible signal-to-noise ratio from an amplifier chain.

Standard optical filter designs appear to be compatible with typical system requirements. Roughly a factor of 2 reduction in system bandwidth compared to the single filter bandwidth should be possible after 100 amplifier stages. Furthermore, some correction to structure in the amplifier gain spectrum may be done by appropriating tailoring the optical filter transmission characteristics.

We claim:

1. A method of operating an optical communication system having a transmitter for generating an optical radiation signal, a receiver of said signal, and an optical fiber communication link interposed between said transmitter and said receiver, spaced greater than seventy (70) kilometers apart said optical fiber communication link having transmission optical fibers concatenated with lumped erbium doped optical fiber amplifiers for amplifying an optical signal as it advances from one amplifier to the next from the transmitter to the receiver comprising the steps of operating each erbium doped optical fiber amplifier in its saturated state, and amplifying the optical signal as it advances through the optical fiber communication link from one amplifier to the next to a power level at the output of each optical amplifier which is substantially constant regardless of the power level of the optical signal received at the input of that optical amplifier.

2. The method of operating an optical communication system of claim 1 wherein the saturated gain of each optical fiber amplifier is set to provide substantially constant signal power at the output of each optical fiber amplifier.

3. The method of operating an optical communication system of claim 1 wherein the pump saturation power of each successive optical fiber amplifier is increased to compensate for the gain saturation caused by the increase of amplified spontaneous emission noise.

4. The method of operating an optical communication system of claim 1 wherein the pump saturation power of each optical fiber amplifier is substantially constant.

* * * * *